(12) United States Patent
Plummer et al.

(10) Patent No.: US 8,499,072 B2
(45) Date of Patent: Jul. 30, 2013

(54) SELF HEALING NETWORKING DEVICE SYSTEMS AND RELATED METHODS

(75) Inventors: Jon R. Plummer, Los Angeles, CA (US); Matthew P. Glidden, Simi Valley, CA (US)

(73) Assignee: Belkin International, Inc., Playa Vista, CA (US)

( * ) Notice: Subject to any disclaimer, the term of this patent is extended or adjusted under 35 U.S.C. 154(b) by 158 days.

(21) Appl. No.: 12/845,682

(22) Filed: Jul. 28, 2010

(65) Prior Publication Data

US 2011/0213877 A1    Sep. 1, 2011

Related U.S. Application Data

(60) Provisional application No. 61/229,206, filed on Jul. 28, 2009.

(51) Int. Cl.
*G06F 15/16* (2006.01)

(52) U.S. Cl.
USPC ........................................... 709/224

(58) Field of Classification Search
USPC ........................................... 709/224
See application file for complete search history.

(56) References Cited

U.S. PATENT DOCUMENTS

| 8,127,159 | B1* | 2/2012 | Chhabra et al. ............... 713/320 |
| 2002/0118641 | A1 | 8/2002 | Kobayashi |
| 2005/0180438 | A1* | 8/2005 | Ko et al. ....................... 370/401 |
| 2006/0235943 | A1* | 10/2006 | Nakai ........................... 709/217 |
| 2008/0049776 | A1 | 2/2008 | Wiley et al. |
| 2008/0292035 | A1 | 11/2008 | Chang |
| 2009/0129273 | A1 | 5/2009 | Zou |
| 2009/0132622 | A1* | 5/2009 | Rossmann et al. ............ 707/206 |
| 2009/0323600 | A1* | 12/2009 | Chandra et al. ............... 370/329 |
| 2010/0030903 | A1* | 2/2010 | Li et al. ........................ 709/228 |
| 2011/0013092 | A1* | 1/2011 | Chung et al. .................. 348/732 |
| 2011/0196946 | A1* | 8/2011 | Manchester et al. .......... 709/220 |

OTHER PUBLICATIONS

Pefkianakis et al. MIMO Rate Adaptation in 802.11 n Wireless Networks. Sep. 2010. ACM.*
Arslan et al. Auto-configuration of 802.11 n WLANs. Nov. 2010. ACM.*
Da Silva et al. TDCS: A New Mechanism for Automatic Channel Assignment for Independent IEEE 802.11 Networks. 2009.*
International Search Report from PCT/US10/43597, 4 pages. Sep. 20, 2010.

* cited by examiner

*Primary Examiner* — Lynn Feild
*Assistant Examiner* — Bryan Lee
(74) *Attorney, Agent, or Firm* — Bryan Cave LLP

(57) ABSTRACT

In one embodiment, a networking system can comprise a networking device comprising an operating system module and performance management modules. The performance management modules can comprise at least one of a channel hopping module or a channel bonding module. The channel hopping module can switch the networking device from a first channel to a second channel having less interference than the first channel. The channel bonding module can toggle the networking device between a single-channel communications mode and a bonded channel communications mode via a plurality of bonded channels. The operating system module can actuate at least one of the performance management modules to sustain a performance level of the networking device in response to one or more triggering events from a performance review operation executed by the operating system module. Other examples and related methods are described herein.

9 Claims, 3 Drawing Sheets

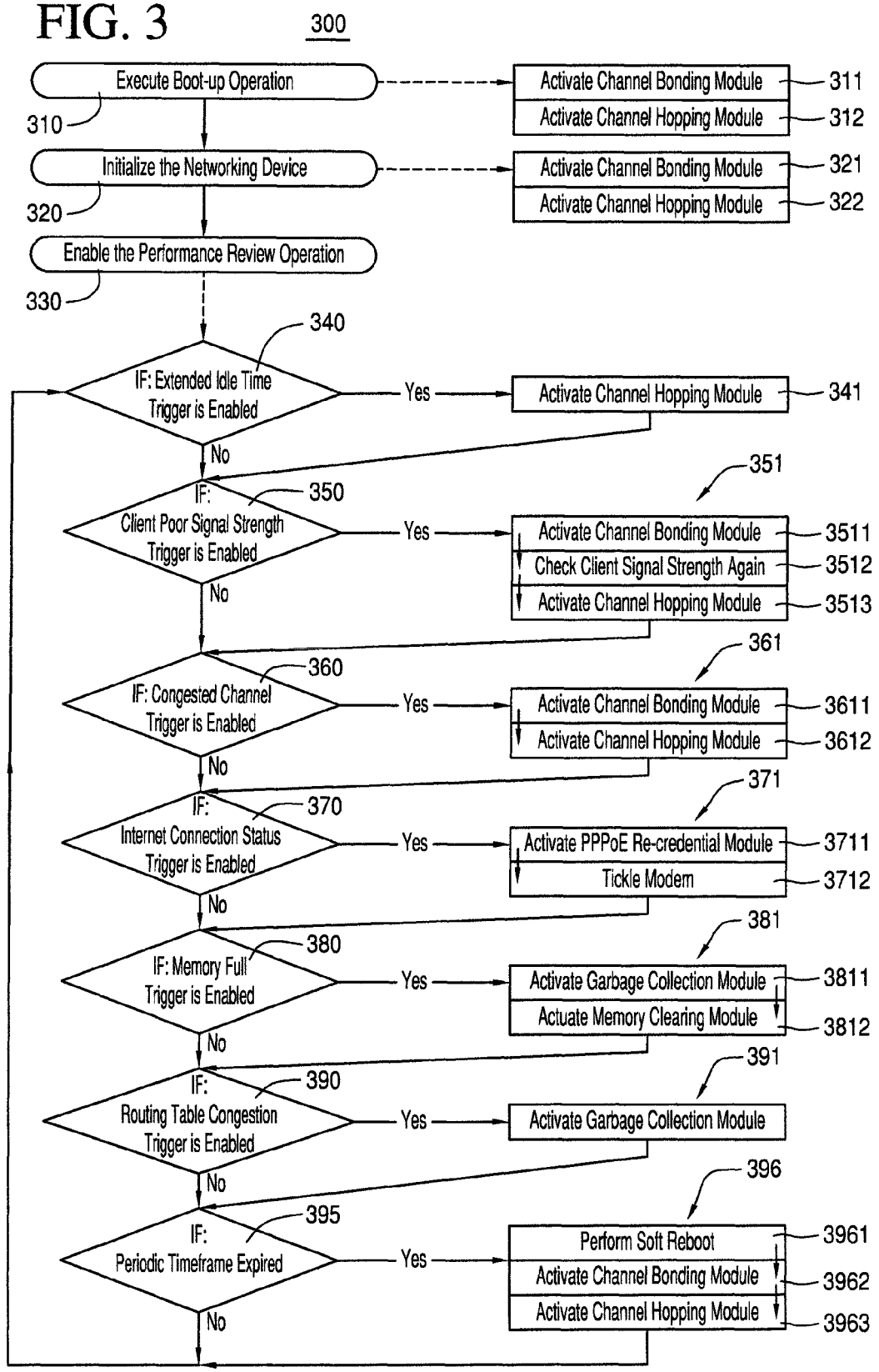

SELF HEALING NETWORKING DEVICE SYSTEMS AND RELATED METHODS

CROSS-REFERENCE TO RELATED APPLICATION

This patent application claims priority to U.S. Provisional Patent Application No. 61/229,206 titled Self Healing Router System, and filed on Jul. 28, 2009. The disclosure of the referenced application is incorporated herein by reference.

TECHNICAL FIELD

This disclosure relates generally to networking systems, and relates more particularly to self healing networking devices, systems, and related methods.

BACKGROUND

With the expansion of internet broadband services and wireless technologies, the use of local networks in home and office environments has become widespread. Such local networks require the use of networking devices such as modems and routers to establish a local area network (LAN) and to communicate one or more client devices of the LAN to the internet. Unfortunately, with the performance demands placed on such networking devices, and the variable nature of wireless links between devices, networking devices often tend to become unstable to the point where their ability to keep client devices connected to each other and to the internet is degraded.

Accordingly, a need exists for networking devices capable of monitoring themselves and/or "self-healing" themselves to maintain the performance of the network connections they support.

BRIEF DESCRIPTION OF THE DRAWINGS

The invention will be better understood from a reading of the following detailed description of examples of embodiments, taken in conjunction with the accompanying figures.

FIG. 3 is an operational flow diagram generally illustrating an embodiment of a method for maintaining and/or improving the performance of a networking device.

Figure 1:
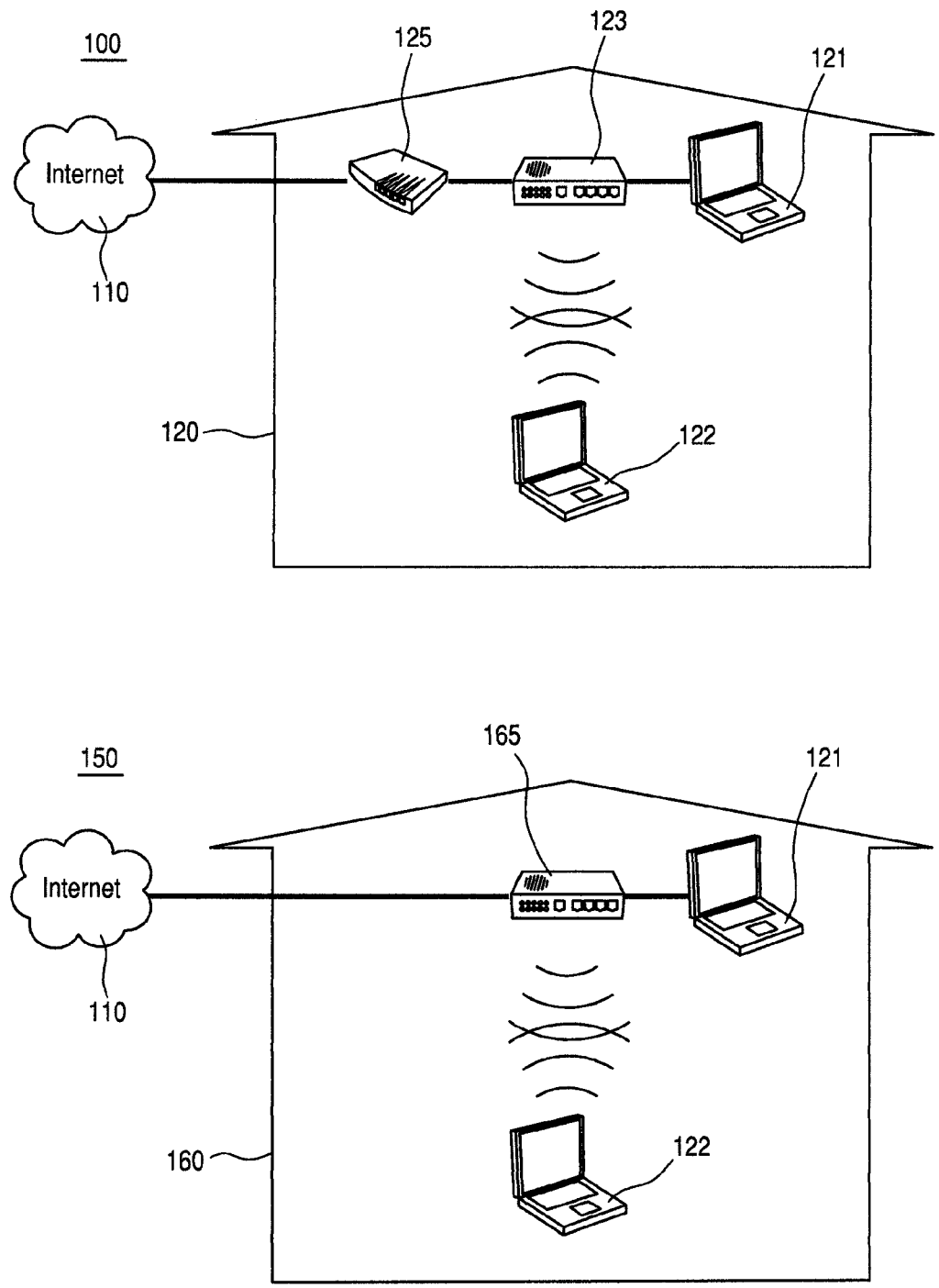
FIG. 1 presents a block diagram illustrating multiple embodiments of an exemplary network with networking devices for providing both wired and/or wireless internet access.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, mechanically or otherwise. Two or more mechanical elements may be mechanically coupled, but not otherwise coupled. Coupling (whether mechanical or otherwise) may be for any length of time, e.g., permanent or semi-permanent or only for an instant. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION

In one embodiment, a networking system can comprise a networking device comprising an operating system module and performance management modules controllable by the operating system module. The performance management modules can comprise at least one of a channel hopping module or a channel bonding module. The channel hopping module can be configured to switch the networking device from a first channel to a second channel having less interference than the first channel. The channel bonding module can be configured to toggle the networking device between a single-channel communications mode via a single channel and a bonded channel communications mode via a plurality of bonded channels. The operating system module can be configured to actuate at least one of the performance management modules to sustain a performance level of the networking device in response to one or more triggering events from a performance review operation executed by the operating system module.

In one embodiment, a router comprises an operating system module and performance management modules controllable by the operating system module. The performance management module can comprise at least one of (1) a channel hopping module configured to switch the router from a first channel to a second channel having less interference than the first channel, or (2) a channel bonding module configured to toggle the router between a single-channel communications mode via a single channel and a bonded channel communications mode via dual channels. The operating system module can be configured to actuate at least one of the performance management modules to sustain a performance level of the router in response to at least one of (1) a periodic trigger enabled upon expiration of a periodic predetermined timeframe, or (2) one or more triggering events from a performance review operation executed by the operating system module.

In one example, a method for providing a networking system can comprise providing a networking device, providing an operating system module for the networking device, and providing performance management modules for the networking device and controllable by the operating system module. Providing the performance management modules can comprise at least one of (1) providing a channel hopping module configured to switch the networking device from a first channel to a second channel having less interference than the first channel, or (2) providing a channel bonding module configured to toggle the networking device between a single-channel communications mode via a single channel and a bonded channel communications mode via dual channels. Providing the operating system module can comprises configuring the operating system module to actuate at least one of the performance management modules to sustain a performance level of the networking device in response to at least one of (1) a periodic trigger enabled upon expiration of a periodic predetermined timeframe, or (2) one or more triggering events from a performance review operation executed by the operating system module.

Other examples and embodiments are further disclosed herein. Such examples and embodiments may be found in the figures, in the claims, and/or in the description of the present application.

Referring now to the figures, FIG. 1 presents a block diagram illustrating multiple embodiments of an exemplary network for providing both wired and/or wireless internet access. FIG. 1 includes first wide area network (WAN) 100 and second wide area network (WAN) 150. First WAN 100 includes first local area network (LAN) 120 that is in bi-directional communication with internet 110, and second WAN 150 includes second LAN (LAN) 160 that is in bi-directional communication with internet 110.

First local area network (LAN) 120 includes modem 125, networking device 123, wired computing device 121 and wireless computing device 122. In FIG. 1, modem 125 is coupled to and in bi-directional communication with internet 110; networking device 123 is coupled to and in bi-directional communication with modem 125; wired computing device 121 is coupled to and in bi-directional communication with networking device 123; and wireless computing device 122 is coupled to and in wireless bi-directional communication with networking device 123. Wired computing device 121 can be implemented as any suitable computing device in wired communication (e.g., via Ethernet cabling) with networking device 123, such as, for example a laptop, a personal computer (PC), a console gaming system (e.g., a SONY Playstation® system), and the like. Wireless computing device 122 can be implemented as any suitable computing device in wireless communication (e.g., pursuant to the IEEE 802.11 (g) standard) with networking device 123, such as, for example a wireless laptop, a personal computer with wireless capabilities, a console gaming system (e.g., a SONY Playstation® system) with wireless capabilities, and the like.

Modem 125 can be a special purpose firmware device for converting digital information produced by computing devices into analog signals for transmission across broadband lines (e.g., coaxial transmission lines). In some embodiments, modem 125 can be implemented as a cable modem and is in bi-directional communication with internet 110 via a wired connection provided by a local cable television or programming provider. In other embodiments, modem 125 can be implemented as a digital subscriber line (DSL) modem and is in bi-directional communication with internet 110 via a wired connection provided by a local telephone service provider. In still other embodiments, modem 125 can be implemented as any other type of modem in communication with internet 110, such as for example a fiber optic solution, a satellite solution or some such other wireless solution (e.g., cellular, hybrid satellite/DSL, and the like) offering internet connectivity to LAN 120.

Networking device 123 can be a special-purpose firmware device coupled to and in communication with one or more computing devices on a LAN such as LAN 120. In some embodiments, networking device 123 facilitates communication between the one or more computing devices associated with LAN 120 and interfaces between LAN 120 and modem 125. In FIG. 1, networking device 123 can be configured to direct packetized data, where the packetized data can be (a) received from internet 110 for an internet protocol (IP) addresses within LAN 120, (b) sent from one or more IP addresses within LAN 120 to one or more IP addresses outside of LAN 120 and serviced by internet 110, and/or (c) sent from one or more IP addresses within LAN 120 to one or more other IP addresses within LAN 120. Networking device 123 can serve as a connection between two or more packet-switched networks and can look at the source and destination addresses of the packets passing through to determine which route to send them. In some examples, networking device 123 can be a router or other networking system switch.

Networking device 165 is a special-purpose firmware device that performs the functions of modem 125 and networking device 123. There can be examples where networking device 165 can comprise a modem-router device. In FIG. 1, networking device 165 is coupled to and in communication with one or more computing devices associated with LAN 160, facilitates communication between the one or more computing devices associated with LAN 160, and interfaces between LAN 160 and internet 110 by converting digital information produced by and received from the computing devices into analog signals for transmission across broadband lines to internet 110. As described above, the router portion of networking device 165 can serve as a connection between two or more packet-switched networks and can look at the source and destination addresses of the packets passing through it to determine which route to send them.

Figure 2:
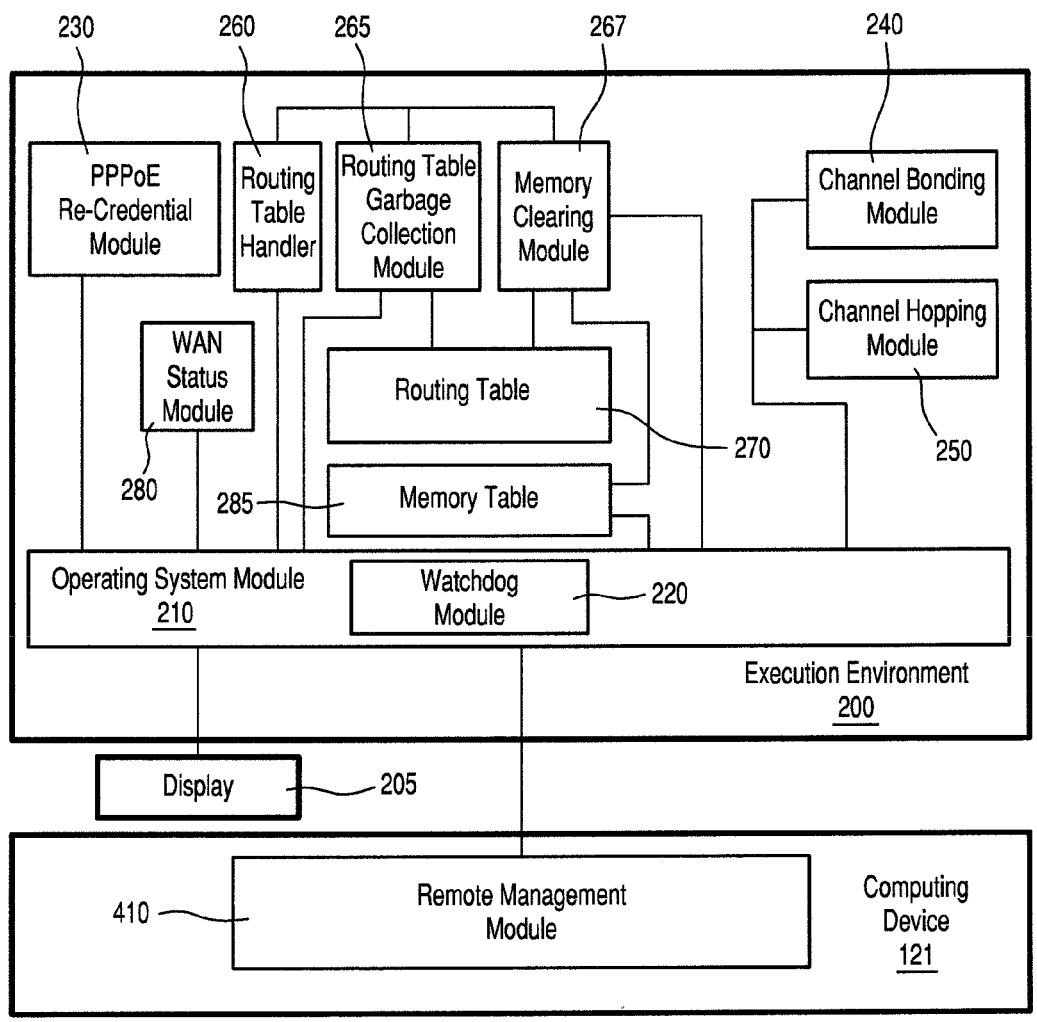
FIG. 2 is a functional block diagram generally illustrating an embodiment of an execution environment in which one or more performance management modules for the networking devices of FIG. 1 may be executed.

FIG. 2 is a functional block diagram generally illustrating an embodiment of an execution environment 200 in which one or more performance management modules for one or more of networking devices 123 or 165 (FIG. 1) may be executed. In some examples, execution environment 200 can be part of, and/or comprise different modules of, a networking device such as networking device 123 or 165 (FIG. 1). For example, execution environment 200 can comprise memory module 285 for a computing device in which computer-executable instructions and computer-readable data structures are stored while the computing device operates. Execution environment 200 may be executed by a microprocessor, for example, and one or more of its modules may comprise hardware and/or software elements. In the present embodiment, execution environment 200 also is coupled to computing device 121, such that remote management module 410 of computing device 121 can communicate with operating system (O/S) module 210 to control one or more features or modules of networking device 123 (FIG. 1).

In the present example, execution environment 200 comprises several performance management modules such as O/S module 210, watchdog module 220, Point-to-Point Protocol over Ethernet (PPPoE) re-credential module 230, channel bonding module 240, channel hopping module 250, routing table garbage collection module 265, and memory clearing module 267. Although watchdog module 220 is presented in FIG. 2 as forming part of O/S module 210, there can be other embodiments where watchdog module 220 is external and/or otherwise coupled to O/S module 210. There can be other embodiments that dispense with watchdog module 220, where O/S module 210 directly monitors and/or controls one or more of the modules of execution environment 200. In addition, although in the present embodiment garbage collection module 265 and memory clearing module 267 can be handled via routing table handler 260, in some examples one or more of garbage collection module 265 and/or memory clearing module 267 may be also handled directly by O/S module 210.

Execution environment 200 can also be coupled to display 205 to allow one or more modules and/or applications running on execution system 200 to communicate to a user. In the present example, display 205 is controlled via O/S module 210. There can be examples, however, where watchdog module 220 and/or other modules of execution environment 200 may communicate with display 205 without using O/S module 210 as an intermediary. Execution environment 200 may also include further elements and/or performance management modules.

In the present example, O/S module 210 can comprise any operating system that organizes and controls hardware and software, such as, for example Linux® 2.6 kernel or some such other proprietary operating system. For example, O/S module 210 may create unique processes in which to execute individual applications, such as, applications of watchdog module 220, applications of PPPoE re-credential module 230, applications of channel bonding module 240, applications of channel hopping module 250, and/or other applications such as a firewall application, a quality of service (QoS) application, and/or routing applications for address allocation, address management, address translation functionality, and the like. O/S module 210 may also create unique processes for the execution of individual applications handled by routing table handler 260, such as for garbage collection module 265 and/or for memory clearing module 267.

Watchdog module 220 may comprise a performance monitoring application, and can serve as an application manager that evaluates performance content received from O/S module 210 and associated applications such as the aforementioned firewall application, QoS application, routing applications, and the like. Watchdog module 220 can call or otherwise enables applications and/or modules, if necessary, based on the aforementioned evaluation by watchdog module 220. In the present example, watchdog module 220 is in communication with routing table handler 260 as well as with PPPoE re-credential module 230, channel bonding module 240, and channel hopping module 250. In some embodiments, when necessary, watchdog module 220 can actuate one or more of PPPoE re-credential module 230, channel bonding module 240, and/or channel hopping module 250 to perform each module's respective functionality to maintain and/or improve router performance. In other embodiments, when necessary, watchdog module 220 can call routing table handler 260 to actuate one or more of garbage collection module 265 and/or memory clearing module 267 to perform each module's respective functionality to improve router performance. In some examples, such as in examples that dispense with watchdog module 220, some of the performance monitoring duties and/or applications of watchdog module 220 can be carried out directly and/or instead by O/S module 210.

PPPoE re-credential module 230 can comprise an application based on a communications standard, such one of the IEEE 802.11 standards. The application of PPPoE re-credential module 230 can enables users on an Ethernet network to virtually "dial" from one machine to another over the Ethernet network, establish a point-to-point connection between them, and then securely transport data packets over the connection. In some examples, when the connection becomes corrupted, PPPoE re-credential module 230 can be used to request a new set of credentials from a PPPOE server and/or to re-register the networking device of execution environment 200 with the PPPoE server.

Channel bonding module 240 can comprise an application based on a communications standard, such as the IEEE 802.11n standard. In the present example, channel bonding module 240 permits an operational mode where two or more channels are "bonded" or concurrently used to transmit and/or receive data packets. Such additional channel bandwidth can permit communications at faster data rates. For example, networking device 123 from FIG. 1 can be configured by channel bonding module 240 to communicate over a single 20 megahertz (MHz) channel, and/or to bond two 20 MHz channels together to approximate a 40 MHz data rate and/or bandwidth. In some embodiments, when the data rate of LAN 120 (FIG. 1) falls below a preset threshold, channel bonding module 240 can be actuated to adjust the channel bonding mode for networking device 123 (FIG. 1).

Channel hopping module 250 can comprise an application based on a communications standard, such as the IEEE 802.11(n) standard. In the example of FIG. 1, channel hopping module 250 of networking device 123 (FIG. 1) can be configured to detect interference patterns associated with the current channel(s) that networking device 123 (FIG. 1) is utilizing, as well as other channels networking device 123 (FIG. 1) is not utilizing. When the interference patterns reach a predetermined level, channel hopping module 250 can switch networking device 123 (FIG. 1) away from the current channel(s) to one or more "cleaner" or less congested channels to reduce the interference pattern.

Routing table handler 260 is configured to manage routing table 270. In the present example, routing table 270 can be configured to comprise information about other networking devices with which networking device 123 communicates, such as their respective IP addresses, routes to such other networking devices, metrics associated with such routes, and the like. Although FIG. 1 presents routing table 270 as separate from memory module 285, there can be embodiments where memory module 285 comprises routing table 270. In the present example, routing table handler 260 can be configured to expose one or more application programming interfaces (APIs) associated with special purpose application(s) and/or modules(s) to watchdog application 220, thereby allowing access to the functionality of such special purpose application(s) or module(s). Routing table handler 260 is in communication with routing table garbage collection module 265 and memory clearing module 267 in the present embodiment.

Garbage collection module 265 comprises a special purpose application for removing unused or unnecessary data from routing table 270 in the present example. Such a functionality can be useful in response to a decrease in efficient functionality due to, for example, a lack of available entry space in routing table 270, a lack of available memory, other system resources, and the like. In one embodiment, specific data or entries can removed based on contents and circumstances of routing table 270. As an example, the specific data can be removed based on the length of time the specific data has been residing in routing table 270, the type of information comprised by the specific data, the circumstances under which the specific data was written to routing table 270, and the like. Additionally, garbage collection module 265 can clear registers associated with the routing table 270 based on the contents and circumstances of routing table 270.

Memory clearing module 267 can comprise a special purpose application for removing data from memory, such as from memory module 285 and/or from routing table 270, based on whether memory module 285 and/or routing table 270 are approaching or have exceeded a maximum capacity. In some examples, specific data can be removed by memory clearing module 267 based on the content and circumstances of memory module 285 and/or of routing table 270. For instance, the specific data can be removed based on the length of time that the specific data has been residing in memory module 285 and/or routing table 270, the type of information comprised by the specific data, the circumstances under which the specific data was stored, and the like.

WAN status module 280 can comprise an application and/or hardware configured to monitor connectivity with internet 110 and/or WAN 100. In some examples, WAN status module 280 can be coupled to and/or otherwise monitor an antenna of networking device 123 (FIG. 1).

FIG. 3 is an operational flow diagram generally illustrating an embodiment of a method 300 for maintaining and/or improving the performance of a networking device. In one embodiment, method 300 can be implemented with components, data, and/or the exemplary operating environments of FIGS. 1-2, above. As an example, one or more steps of method 300 can be embodied in a computer readable medium containing computer readable code such that a series of steps are implemented when the computer readable code is executed on a computing device such as, for example a computer, a computer system, a router, and the like. In some implementations, certain steps of method 300 are can be combined, performed simultaneously, or performed in a different order, without deviating from the objectives of method 300.

Step 310 of method 300 comprises executing a boot-up operation of the networking device. In some examples, the networking device can be similar to networking device 123 and/or 165 of FIG. 1, and the boot-up operation can comprise turning on networking the networking device, such as after making all pertinent physical connections into LAN 120. In some examples, step 310 can comprise substeps, such as substeps 311-312, for actuating one or more of the performance management modules described above with respect to execution environment 200 (FIG. 2).

In some examples, substep 311 can comprise actuating a channel bonding module of the networking device. With respect to the example of FIGS. 1-2, the channel bonding module of step 311 (FIG. 3) can be similar to channel bonding module 240 in execution environment 200 of networking device 123. Returning to FIG. 3, in substep 311, the channel bonding module can toggle the networking device between a single-channel communications mode (via a single channel) and a bonded channel communications mode (via a plurality of bonded channels) for increased data rate and/or bandwidth. Depending on specific circumstances of particular networking setups, should the bonded channel communications mode prove unsatisfactory for a particular implementation, the channel bonding module may toggle or keep the networking device in the single-channel communications modes.

In some examples, substep 312 can comprise actuating a channel hopping module of the networking device. With respect to the example of FIGS. 1-2, the channel hopping module of step 312 (FIG. 3) can be similar to channel hopping module 250 in execution environment 200 of networking device 123. Returning to FIG. 3, in step 312, the channel hopping module can switch the networking device from a first channel to a second channel having less interference or congestion than the first channel. For example, the channel hopping module can determine a channel that is experiencing less interference than the channel currently in use by the networking device, and may then switch the networking device to such channel with less interference.

There can be examples where only one of substeps 311-312 is executed under step 310. There can also be examples where step 312 is executed only if step 311 proves unsatisfactory to establish a certain level of connectivity or communication for the networking device, or vice-versa. There can also be embodiments where further substeps for other performance management modules can be executed as part of step 310.

Method 300 can continue with step 320 for initializing the networking device. There can be examples where step 320 need be executed only when needed, such as when the networking device is first integrated into a LAN or WAN. In some examples, initializing the networking device in step 320 can comprise a setup operation of the networking device for communications with other components or elements of a network. As an example, with respect to FIGS. 1-2, step 320 (FIG. 3) can comprise initializing networking device 123 to communicate with components of LAN 120, such as modem 125, and/or computing devices 121-122, and/or to communicate with components of WAN 100 such as internet 110 and/or LAN 160. In some examples, the networking device and/or modules thereof can be initialized at least in part via an external application such as remote management module 410 in communication with O/S module 210 (FIG. 2). For instance, remote management module 410 can be used to enable a user to set one or more parameters to control one or more of the performance management modules of execution environment 200 (FIG. 2). Remote management module 410 can also comprise troubleshooting tools to assist a user in troubleshooting or setting up the networking device via one or more of the performance management modules described above for execution environment 200 (FIG. 2). In the same or other examples, the networking device can be initialized in step 320 (FIG. 3) automatically, such as via an application of operating system module 210 (FIG. 2).

In the present example of FIG. 3, step 320 comprises substeps 321-322. Substep 321 comprises actuating the channel bonding module of the networking device, and can be similar to substep 311. Substep 322 comprises actuating the channel hopping module of the networking device, and can be similar to substep 312. There can be examples where only one of substeps 321-322 is executed under step 310. There can also be examples where step 322 is executed only if step 321 proves unsatisfactory to establish a certain level of connectivity or communication for the networking device, or vice-versa. There can also be embodiments where further substeps for other performance management modules can be executed as part of step 320.

In some embodiments, method 300 can continue with step 330 for enabling a performance review operation. There can be examples where the performance review operation can be carried out and/or controlled by watchdog module 220 (FIG. 2) and/or by O/S module 210 (FIG. 2). The performance review operation can be configured to evaluate performance or status information received from one or more modules, such as software applications and/or hardware elements, of the networking device. For example, with respect to the example of FIGS. 1-2, the performance review operation can monitor for one or more triggering events indicative of a performance degradation from one or more components or modules in execution environment 200 of networking device 123. Upon receipt or identification of such triggering events, the performance review operation can call or otherwise actuate performance management modules and/or special purpose applications, if necessary, to address such performance degradation issues. There can be examples where the performance review operation can be executed continuously to iteratively scan for the one or more triggering events. The performance review operation may also be executed periodically and/or upon request from a user.

In the present example of FIG. 3, the performance review operation of step 330 comprises substep 340 for determining if an extended idle time threshold trigger is enabled for the networking device. With respect to the example of FIGS. 1-2, the extended idle time threshold trigger can be indicative of a situation where networking device 123 is experiencing an extended idling time waiting for communication or feedback from other elements of the LAN 120 and/or WAN 100. In some examples, the extended idle time threshold can be measured in seconds, minutes, or hours. Returning to FIG. 3, if the extended idle time threshold trigger is enabled, method 300 can continue to substep 341. Otherwise, method 300 can continue to other steps of the performance review operation, such as substep 350.

Substep 341 comprises actuating the channel hopping module of the networking device. In some examples, substep 341 can be similar to substep 312 as described above for step 310. There can also be embodiments where further substeps for other performance management modules can be executed when the extended idle time trigger is identified as enabled as part of substep 340. With respect to the example of FIGS. 1-2, substep 341 (FIG. 3) can comprise an actuation of channel hopping module 250 in the execution environment 200 of networking device 123. Returning to FIG. 3, upon completion of substep 341, method 300 can continue to other steps of the performance review operation, such as substep 350.

In the present example, the performance review operation of step 330 comprises substep 350 for determining if a client poor signal strength trigger is enabled for the networking device. With respect to the example of FIGS. 1-2, the client poor signal strength trigger can be indicative of a situation where the signal strength for one or more clients of networking device 123 falls below a predetermined client signal strength value. In some examples, the one or more clients of networking device 123 may be elements coupled to WAN 100, such as computing device 122. Returning to FIG. 3, if the client poor signal strength trigger is enabled, method 300 can continue to substeps 351. Otherwise, method 300 can continue to other steps of the performance review operation such as substep 360.

Substeps 351 comprise substeps 3511-3513, as described below for the present example. Substep 3511 comprises actuating the channel bonding module of the networking device, and can be similar to substep 311. Substep 3512 comprises checking the client poor signal strength trigger, and can be carried out between substeps 3511 and 3513. Substep 3513 comprises actuating the channel hopping module of the networking device, and can be similar to substep 312. There can be other examples where substeps 351 comprise only a portion of substeps 3511-3513. For example, substeps 351 may comprise only substep 3511 in some examples. There also can be other examples where substeps 351 may be carried out in a different order. For example, substep 3513 may be carried out before substep 3512, and substep 3511 may be carried out after substep 3512. Substep 3512 may be omitted in other examples. In some examples, one of substeps 3511 or 3513 need not be executed if a different one of substeps 3511 or 3513 is successful in disabling the client poor signal strength trigger by restoring the client signal strength. There can also be embodiments where further substeps for other performance management modules can be executed with respect to substeps 351. Upon completion of substeps 351, method 300 can continue to other steps of the performance review operation, such as substep 360.

In the present example, the performance review operation of step 330 comprises substep 360 for determining if an congested channel trigger is enabled for the networking device. With respect to the example of FIGS. 1-2, the congested channel trigger can be indicative of a situation where a communications channel being used by networking device 123 is experiencing interference or congestion that degrades or impedes the ability of networking device 123 to effectively communicate with other elements of LAN 120 and/or WAN 100. In one example, the congested channel trigger can be enabled if an interference level of the communications channel exceeds a threshold number of network devices contesting the communications channel, and/or a noise level threshold indicative of a low signal to noise ratio for the communications channel. Returning to FIG. 3, if the congested channel trigger is enabled, method 300 can continue to substeps 361. Otherwise, method 300 can continue to other steps of the performance review operation, such as substep 370.

Substeps 361 comprise substeps 3611-3612, as described below for the present example. Substep 3611 comprises actuating the channel bonding module of the networking device, and can be similar to substep 311. Substep 3612 comprises actuating the channel hopping module of the networking device, and can be similar to substep 312. There can be examples where substeps 361 comprise only a portion of substeps 3611-3612. For example, substeps 361 may comprise only substep 3611 or only substep 3612 in some examples. There also can be other examples where substeps 361 may be carried out in a different order. For example, substep 3611 may be carried out after substep 3612. In some examples, one of substeps 3611 or 3612 need not be executed if a different one of substeps 3611 or 3612 is successful in disabling the congested channel trigger. There can also be embodiments where further substeps for other performance management modules can be executed with respect to substep 361. Upon completion of substeps 361, method 300 can continue to other steps of the performance review operation, such as substep 370.

In the present example, the performance review operation of step 330 comprises substep 370 for determining if an internet connection status trigger is enabled for the networking device. With respect to the example of FIGS. 1-2, the internet connection status trigger can be indicative of a situation where networking device 123 cannot communicate with internet 110 via WAN 100. For example, WAN status module 280 can be configured to monitor connectivity with internet 110, and to enable the internet connection status trigger is such connectivity is unavailable. Watchdog module 220 and/or O/S module 210 may be configured to monitor WAN status module 280 and to react accordingly when internet connection status trigger is enabled. Returning to FIG. 3, if the internet connection status trigger is enabled, method 300 can continue to substeps 371. Otherwise, method 300 can continue to other steps of the performance review operation, such as substep 380.

Substeps 371 comprise substeps 3711-3712, as described below for the present example. Substep 3711 comprises actuating a PPPoE re-credential module of the networking device, such as PPPoE re-credential module 230 (FIG. 2) in execution environment 200 (FIG. 2) for networking device 123 (FIG. 1). In substep 371, PPPoE credentials can be re-issued for the networking device. In some embodiments, the PPPoE re-credential module enables the networking device to re-register and obtain a new set of credentials from a PPPoE server. The re-registration process can comprise a PPPoE discovery, and can involve one or more of an initiation step, an offer step, a request step and/or a confirmation step. For the initiation step, the PPPoE re-credential module may send a PPPoE Active Discovery Initiation (PADI) packet to the PPPoe server to initiate the session. For the offer step, the PPPoE server can respond with a PPPoE Active Discovery Offer (PADO) packet. For the request step, the PPPoE re-credential module can respond to the PADO packet by sending a PPPoE Active Discovery Request (PADR) packet to the PPPoE server. For the confirmation step, after receipt of the PADR packet, the PPPoE server can generate a unique ID for the PPP session and can send it in a PPPoE Active Discovery Session (PADS) confirmation packet to the PPPoE re-credential module.

Substep 3712 comprises tickling the modem to which the networking device is coupled. With respect to FIGS. 1-2, networking device 123 could "tickle" modem 125 via PPPoE re-credential module 230, watchdog module 220, or operating system 210, to establish and/or to determine if an acceptable connection is established between the modem and the router. Although step 3712 is shown in FIG. 3 as being carried out after substep 3711, there can be embodiments where substep 3712 can be carried out before and/or without regards to substep 3711. Upon completion of substeps 371, method 300 can continue to other steps of the performance review operation, such as substep 380.

In the present example, the performance review operation of step 330 comprises substep 380 for determining if an a memory full trigger is enabled for the networking device. Operating a networking device at or near the limit of its memory may lead to a decrease in efficient functionality. With respect to the example of FIGS. 1-2, the memory full trigger can be indicative of a situation where memory module 280 of networking device 123 is filled such as to approach and/or exceed a memory capacity threshold. If the memory full trigger is enabled, method 300 in FIG. 3 can continue to substeps 381. Otherwise, method 300 can continue to other steps of the performance review operation, such as substep 390.

Substeps 381 comprise substeps 3811 and 3812, as described below for the present example. Substep 3811 comprises actuating a routing table garbage collection module of the networking device, such as routing table garbage collection module 265 (FIG. 2) in execution environment 200 (FIG. 2) for networking device 123 (FIG. 1), to determine dispensable routing table entries in routing table 270 (FIG. 2) and/or to flag such dispensable routing table entries as overwriteable. Substep 3812 comprises actuating a memory clearing module of the networking device, such as memory clearing module 267 (FIG. 2) in execution environment 200 (FIG. 2) for networking device 123 (FIG. 1), to determine dispensable memory portions or registers of memory module 280 (FIG. 2), and/or in routing table 270 (FIG. 2), and/or to flag the data in such dispensable memory portions as overwriteable. There can be examples where the dispensable memory portions can be determined based on a predetermined priority, as established by the manufacturer, for increasing the efficiency of the networking device.

In some examples, one or more of substeps 3811 and/or 3812 can be actuated by one or more of watchdog module 220 (FIG. 2), operating system 210 (FIG. 2), and/or routing table handler 260 (FIG. 2). There can be examples where substeps 381 comprise only a portion of substeps 3811-3812. For example, substeps 381 may comprise only substep 3811 or only substep 3812 in some examples. There also can be other examples where substeps 381 may be carried out in a different order. For example, substep 3811 may be carried out after substep 3812. In some examples, one of substeps 3811 or 3812 need not be executed if a different one of substeps 3811 or 3812 is successful in disabling the memory full trigger. There can also be embodiments where further substeps for other performance management modules can be executed with respect to substeps 381. Upon completion of substeps 381, method 300 can continue to other steps of the performance review operation, such as substep 390.

In the present example, the performance review operation of step 330 comprises substep 390 for determining if a routing table congestion trigger is enabled for the networking device. Operating a networking device at or near the limit of its routing table may lead to a decrease in efficient functionality. With respect to the example of FIGS. 1-2, the routing table congestion trigger can be indicative of a situation where routing table 270 in execution environment 200 of networking device 123 is filled such as to approach and/or exceed a routing table capacity threshold. If the routing table congestion trigger full trigger is enabled, method 300 in FIG. 3 can continue to substep 391. Otherwise, method 300 can continue to other steps of the performance review operation, such as substep 395.

Substep 391 comprises actuating the routing table garbage collection module of the networking device, such as routing table garbage collection module 265 in execution environment 200 (FIG. 2) for networking device 123 (FIG. 1), to determine dispensable routing table entries in routing table 270 (FIG. 2) and/or to flag such dispensable routing table entries as overwriteable. In some examples, substep 391 can be actuated by one or more of watchdog module 220 (FIG. 2), operating system 210 (FIG. 2), and/or routing table handler 260 (FIG. 2). There can also be embodiments where further substeps for other performance management modules can be executed with respect to substep 391. Upon completion of substeps 391, method 300 can continue to other steps of the performance review operation, such as substep 395.

In the present example, the performance review operation of step 330 comprises substep 395 for determining if a periodic trigger is enabled for the networking device. With respect to the example of FIGS. 1-2, the periodic trigger can be indicative of a situation where one or more or the performance management modules in execution environment 200 (FIG. 2) of networking device 123 (FIG. 1) are set to be actuated by O/S module 210 (FIG. 2) and/or by watchdog module 220 (FIG. 2). As an example, the periodic trigger can be set to be enabled upon the expiration of a predetermined amount of time, such as every week or month, and/or at predetermined times, such as every Tuesday at 3:30 a.m. If the periodic trigger is enabled, method 300 can continue to substeps 396. Otherwise, method 300 can continue to other steps of the performance review operation, such as substep 340.

Substeps 396 comprise substeps 3961-3963, as described below for the present example. Substep 3961 comprises performing a soft reboot of the networking device. Substep 3962 comprises actuating the channel bonding module of the networking device, and can be similar to substep 311. Substep 3963 comprises actuating the channel hopping module of the networking device, and can be similar to substep 312. There can be examples where substeps 396 comprise only a portion of substeps 3961-3963. For example, substeps 396 may comprise only one of substep 3961, 3962, or 3963 in some examples. There also can be other examples where substeps 396 may be carried out in a different order. For example, substep 3963 may be carried out before substep 3962. There can also be embodiments where further substeps for other performance management modules can be executed with respect to substeps 396. Upon completion of substeps 396, method 300 can continue to other steps of the performance review operation, such as substep 340.

In some examples, some of the steps of method 300 can be subdivided into one or more sub-steps. In the same or other examples, one or more of the different steps of method 300 can be combined into a single step or performed simultaneously, and/or the sequence of such steps can be changed. For example, substep 390 may be combined or performed simultaneously with substep 380 on some implementations. There can also be examples where method 300 can comprise further or different steps. For example, other steps may be added to monitor and/or react to other triggering events by actuating one or more performance management modules of the networking device. In addition, there may be examples where method 300 can comprise only part of the steps described above. For example, method 300 may comprise only steps 310 and/or 320 in some examples. There may also be cases where the performance review operation of step 330 is configured to execute only some of substeps 340, 350, 360, 370, 380, 390, and/or 395. In one example, the performance review operation of step 330 executes only substep 395. Furthermore, some of the steps of method 300 may be carried out in a different order. As an example, any of substeps 340, 350, 360, 370, 380, 390, and/or 395 may be carried out before or after each other in some examples. Other variations can be implemented for method 300 without departing from the scope of the present disclosure.

Although the self-healing networking device systems and related methods herein have been described with reference to specific embodiments, various changes may be made without departing from the spirit or scope of the present disclosure. Examples of such options and other embodiments have been given in the foregoing description.

For example, although computing devices 121 and 122 are illustrated in FIG. 1 as laptop computers, there can be embodiments where computing devices 121 and/or 122 may be other devices such as iPad® devices, desktop computers, workstations, and/or servers. Accordingly, the description is intended to be illustrative of the scope of the present disclosure and is not intended to be limiting. Other permutations of the different embodiments having one or more of the features of the various figures are likewise contemplated. It is intended that the scope described herein shall be limited only to the extent required by the appended claims.

The self-healing networking device systems and related methods discussed herein may be implemented in a variety of embodiments, and the foregoing discussion of these embodiments does not necessarily represent a complete description of all possible embodiments. Rather, the detailed description of the drawings, and the drawings themselves, disclose at least one preferred embodiment, and may disclose additional embodiments.

All elements claimed in any particular claim are essential to the self-healing networking device systems and related methods claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefit, advantage, solution, or element is stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A networking system comprising:
 a networking device comprising:
  an operating system module;
  performance management modules controllable by the operating system module; and
  a memory module comprising:
   the operating system module; and
   a routing table of the networking device;
 wherein:
  the performance management modules comprise:
   a channel hopping module configured to switch the networking device from a first channel to a second channel having less interference than the first channel;
   a channel bonding module configured to toggle the networking device between a single-channel communications mode via a single channel and
    a bonded channel communications mode via bonded channels;
   a routing table garbage collection module; and
   at least one of:
    a PPPoE re-credential module; or
    a memory clearing module;
  the operating system module is configured to actuate at least one of the performance management modules to sustain a performance level of the networking device in response to:
   one or more triggering events from a performance review operation executed by the operating system module;
  the operating system module is configured to iteratively scan for each of the one or more triggering events;
  the operating system module is configured to:
   execute the performance review operation by ascertaining a status of one or more software applications or hardware elements of the networking device; and
   actuate the at least one of the performance management modules in response to the one or more triggering events from the performance review operation;
  the one or more triggering events comprise:
   a routing table congestion trigger enabled when entries of the routing table exceeds a capacity threshold of the routing table;
   a congested channel trigger enabled when the first channel experiences an interference level exceeding a noise level threshold indicative of a low signal-to-noise ratio; and
   at least one of:
    an extended idle time threshold trigger enabled when an idle time of the networking device exceeds a predetermined idle time value for failure to receive feedback from a network element;

a client poor signal strength trigger enabled when a signal strength for an active client falls below a predetermined client signal strength value;

the congested channel trigger enabled when the interference level of the first channel exceeds a threshold number of network devices sharing the first channel;

a memory full trigger enabled when the memory module of the networking device exceeds a capacity threshold of the memory module; or an internet connection status trigger enabled when communication with the internet is unavailable for the networking device;

when the internet connection status trigger is enabled:
the PPPoE re-credential module is actuated to re-register the networking device with a new set of credentials from a PPPoE server;

when the congested channel trigger is enabled:
at least one of the channel hopping module or the channel bonding module is actuated to sustain the performance level of the networking device;

when the extended idle time threshold trigger is enabled:
the channel hopping module is actuated to:
determine the second channel out of available channels based on the interference level of the available channels; and
switch the networking device from the first channel to the second channel;

when the client poor signal strength trigger is enabled:
the channel bonding module is actuated to:
toggle the networking device from:
(a) one of the single-channel communications mode or the bonded channel communications mode, to
(b) a different one of the single-channel communications mode or the bonded channel communications mode;
and
when the client poor signal strength trigger remains enabled after the networking device has been toggled by the channel bonding module:
the channel hopping module is actuated;

when the congested channel trigger is enabled:
the channel bonding module is actuated; and
then, if the congested channel trigger remains enabled:
the channel hopping module is actuated;

when the routing table congestion trigger is enabled:
the routing table garbage collection module is actuated to determine dispensable routing table entries in the routing table and to flag the dispensable routing table entries as overwriteable;
and when the memory full trigger is enabled, at least one of the following is actuated:
the routing table garbage collection module; or
the memory clearing module to determine dispensable memory portions of the memory module and to flag the dispensable memory portions as overwriteable.

2. The networking system of claim 1, wherein:
the operating system module is configured to actuate at least one of the performance management modules in response to at least one of:
a setup operation of the networking system; or
a boot-up operation of the networking device.

3. The networking system of claim 1, wherein:
the one or more triggering events comprise a periodic trigger enabled upon expiration of a periodic predetermined timeframe; and
the performance review operation is configured to actuate one or more of the performance management modules each time the periodic trigger is enabled.

4. The networking system of claim 1, wherein:
the operating system module is configured to:
monitor the one or more software applications or hardware elements of the networking device for the one or more triggering events.

5. The networking system of claim 1, wherein:
the operating system module comprises a watchdog module configured to monitor the status of the one or more software applications or hardware elements of the networking device.

6. The networking system of claim 5, wherein:
the watchdog module is configured to actuate one or more of the performance management modules pursuant to at least one of:
the status of one or more software applications or hardware elements of the networking device;
a setup operation of the networking system;
a boot-up operation of the networking device;
an expiration of a periodic predetermined timeframe; or
the one or more triggering events from the performance review operation.

7. The networking system of claim 1, further comprising:
a remote management module coupled to and external to the networking device;
wherein the remote management module is configured to actuate one or more of the performance management modules of the networking device based on user input.

8. A router comprising:
an operating system module;
performance management modules controllable by the operating system module; and
a memory module comprising:
the operating system module; and
a routing table of the router;
wherein:
the performance management modules comprise:
a PPPoE re-credential module;
a channel hopping module configured to switch the router from a first channel to a second channel having less interference than the first channel;
a channel bonding module configured to toggle the router between a single-channel communications mode via a single channel and
a bonded channel communications mode via dual channels;
a memory clearing module; and
a routing table garbage collection module;
the operating system module is configured to actuate at least one of the performance management modules to sustain a performance level of the router in response to:
one or more triggering events from a performance review operation executed by the operating system module;
the operating system module is configured to iteratively scan for each of the one or more triggering events;
the operating system module is configured to:
execute the performance review operation by ascertaining a status of one or more software applications or hardware elements of the router; and actuate the at least one of the performance management modules in response to the one or more triggering events from the performance review operation;
the one or more triggering events comprise:
an internet connection status trigger enabled when communication with the internet is unavailable for the router;
a congested channel trigger enabled when the first channel experiences an interference level exceeding a noise level threshold indicative of a low signal-to-noise ratio; and
at least one of:
an extended idle time threshold trigger enabled when an idle time of the router exceeds a predetermined idle time value;
a client poor signal strength trigger enabled when a signal strength for an active client falls below a predetermined client signal strength value;
the congested channel trigger enabled when the first channel experiences the interference level exceeding a threshold number of network devices sharing the first channel;
a memory full trigger enabled when the memory module of the router exceeds a capacity threshold of the memory module; or
a routing table congestion trigger enabled when entries of the routing table exceeds a capacity threshold of the routing table;
when the internet connection status trigger is enabled:
the PPPoE re-credential module is actuated to re-register the router with a new set of credentials from a PPPoE servers;
when the congested channel trigger is enabled:
at least one of the channel hopping module or the channel bonding module is actuated to sustain the performance level of the router;
when the extended idle time threshold trigger is enabled:
the channel hopping module is actuated to:
determine the second channel out of available channels based on the interference level of the available channels; and
switch the router from the first channel to the second channel;
when the client poor signal strength trigger is enabled:
the channel bonding module is actuated to:
toggle the router from:
(a) one of the single-channel communications mode or the bonded channel communications mode, to
(b) a different one of the single-channel communications mode or the bonded channel communications mode;
and
when the client poor signal strength trigger remains enabled after the router has been toggled by the channel bonding module:
the channel hopping module is actuated;
when the congested channel trigger is enabled:
the channel bonding module is actuated, and then, if the congested channel trigger remains enabled, the channel hopping module is actuated;
when the routing table congestion trigger is enabled:
the routing table garbage collection module is actuated to determine dispensable routing table entries in the routing table and to flag the dispensable routing table entries as overwriteable;
and
when the memory full trigger is enabled, at least one of the following is actuated:
the routing table garbage collection module; or
the memory clearing module to determine dispensable memory portions of the memory module and to flag the dispensable memory portions as overwriteable.

9. A method for providing a networking system, the method comprising:
providing a networking device;
providing an operating system module for the networking device; and
providing performance management modules for the networking device and controllable by the operating system module;
wherein:
a memory module of the networking device comprises:
the operating system module; and
a routing table;
providing the performance management modules comprises:
providing a routing table garbage collection module;
providing a channel hopping module configured to switch the networking device from a first channel to a second channel having less interference than the first channel;
providing a channel bonding module configured to toggle the networking device between a single-channel communications mode via a single channel and
a bonded channel communications mode via dual channels;
and
at least one of:
providing a PPPoE re-credential module; or
providing a memory clearing module;
providing the operating system module comprises:
configuring the operating system module to actuate at least one of the performance management modules to sustain a performance level of the networking device in response to:
one or more triggering events from a performance review operation executed by the operating system module;
providing the operating system module comprises:
configuring the operating system module to:
iteratively scan for each of the one or more triggering events;
execute the performance review operation by ascertaining a status of one or more software applications or hardware elements of the networking device; and
actuate the at least one of the performance management modules in response to the one or more triggering events from the performance review operation;
the one or more triggering events comprise:
a routing table congestion trigger enabled when entries of the routing table exceed a capacity threshold of the routing table;
a congested channel trigger enabled when the first channel experiences an interference level exceeding a noise level threshold indicative of a low signal-to-noise ratio; and at least one of:
- an extended idle time threshold trigger enabled when an idle time of the networking device exceeds a predetermined idle time value;
- a client poor signal strength trigger enabled when a signal strength for an active client falls below a predetermined client signal strength value;
- the congested channel trigger enabled when the first channel experiences the interference level exceeding a threshold number of network devices sharing the first channel;
- a memory full trigger enabled when the memory module of the networking device exceeds a capacity threshold of the memory module; or
- an internet connection status trigger enabled when communication with the internet is unavailable for the networking device;

when the one or more triggering events comprises the internet connection status trigger, and the performance management modules comprise the PPPoE re-credential module, providing the operating system module comprises configuring the operating system module to:
- actuate the PPPoE re-credential module to re-register the networking device with a new set of credentials from a PPPoE server;

when the congested channel trigger is enabled:
- at least one of the channel hopping module or the channel bonding module is actuated to sustain the performance level of the networking device;

when the one or more triggering events comprises the extended idle time threshold trigger, providing the operating system module comprises configuring the operating system module to:
- actuate the channel hopping module to:
  - determine the second channel out of available channels based on the interference level of the available channels; and
  - switch the networking device from the first channel to the second channel;

when the one or more triggering events comprises the client poor signal strength trigger, providing the operating system m m rises configuring the operating s stem module to:
- actuate the channel bonding module to:
  - toggle the networking device from:
    - (a) one of the single-channel communications mode or the bonded channel communications mode, to
    - (b) a different one of the single-channel communications mode or the bonded channel communications mode;
  and
  - actuate the channel hopping module when the client poor signal strength trigger remains enabled after the networking device has been toggled by the channel bonding module;

when the one or more triggering events comprises the congested channel trigger, roviding the operating system m m rises configuring the operating s stem module to:
- actuate the channel bonding module, and then, if the congested channel trigger remains enabled, actuate the channel hopping module;

when the routing table congestion trigger enabled:
- the routing table garbage collection module is actuated to determine dispensable routing table entries in the routing table and to flag the dispensable routing table entries as overwriteable;

and when the one or more triggering events comprises the memory full trigger, and the performance management modules comprise the memory clearing module, providing the operating system module comprises configuring the operating system module to actuate at least one of:
- the routing table garbage collection module; or
- the memory clearing module to determine dispensable memory portions of the memory module and to flag the dispensable memory portions as overwriteable.

* * * * *

UNITED STATES PATENT AND TRADEMARK OFFICE
CERTIFICATE OF CORRECTION

| | | |
|---|---|---|
| PATENT NO. | : 8,499,072 B2 | Page 1 of 1 |
| APPLICATION NO. | : 12/845682 | |
| DATED | : July 30, 2013 | |
| INVENTOR(S) | : Plummer et al. | |

It is certified that error appears in the above-identified patent and that said Letters Patent is hereby corrected as shown below:

In the specification

In Column 2, Line 34, delete "DESCRIPTION" and insert -- DETAILED DESCRIPTION --, therefor.

In Column 3, Line 36, delete "LAN" and insert -- local area network --, therefor.

In Column 6, Line 10, delete "PPPOE" and insert -- PPPoE --, therefor.

In Column 11, Line 12, delete "PPPoe" and insert -- PPPoE --, therefor.

In Column 11, Line 35, delete "an a" and insert -- a --, therefor.

In Column 11, Line 40, delete "module 280" and insert -- module 285 --, therefor.

In Column 11, Line 59, delete "module 280" and insert -- module 285 --, therefor.

In the claims

In Column 14, Line 30, in Claim 1, delete "channel" and insert -- channel; --, therefor.

In Column 16, Line 50, in Claim 8, delete "channel" and insert -- channel; --, therefor.

In Column 18, Lines 32-33, in Claim 9, delete "channel" and insert -- channel; --, therefor.

In Column 20, Lines 3-4, in Claim 9, delete "m m rises configuring the operating s stem" and insert -- module comprises configuring the operating system --, therefor.

In Column 20, Line 18, in Claim 9, delete "roviding" and insert -- providing --, therefor.

In Column 20, Line 19, in Claim 9, delete "m m rises configuring the operating s stem" and insert -- module comprises configuring the operating system --, therefor.

Signed and Sealed this
Thirteenth Day of October, 2015

Michelle K. Lee
*Director of the United States Patent and Trademark Office*